(12) United States Patent
Soulier (10) Patent No.: US 6,875,394 B2
(45) Date of Patent: Apr. 5, 2005

(54) METHOD AND DEVICE FOR TRANSFORMING CRYSTALLINE OR SEMICRYSTALLINE POLYMERS

(75) Inventor: Joël Soulier, La Chaussee d'Ivry (FR)

(73) Assignee: International Brain System S.A., Beaufays (BE)

( * ) Notice: Subject to any disclaimer, the term of this patent is extended or adjusted under 35 U.S.C. 154(b) by 353 days.

(21) Appl. No.: 10/200,454

(22) Filed: Jul. 23, 2002

(65) Prior Publication Data

US 2003/0047842 A1 Mar. 13, 2003

Related U.S. Application Data

(63) Continuation-in-part of application No. PCT/BE01/00012, filed on Jan. 24, 2001.

(30) Foreign Application Priority Data

Jan. 24, 2000 (BE) .......................................... 2000/0052

(51) Int. Cl.⁷ ............................................. B29C 47/00
(52) U.S. Cl. ....................... 264/449; 264/451; 264/452; 264/450; 425/3
(58) Field of Search ................................ 264/449, 452, 264/450, 451, 464, 467; 425/3

(56) References Cited

U.S. PATENT DOCUMENTS

| | | | | |
|---|---|---|---|---|
| 3,943,614 A | * | 3/1976 | Yoshikawa et al. | ......... 29/25.35 |
| 4,683,093 A | * | 7/1987 | Hagiwara et al. | ............ 264/479 |
| 4,810,319 A | * | 3/1989 | Isner | ...................... 156/244.11 |
| 4,810,432 A | * | 3/1989 | Kisler | .......................... 264/484 |
| 5,254,297 A | * | 10/1993 | Deeds | ......................... 264/464 |

FOREIGN PATENT DOCUMENTS

| | | |
|---|---|---|
| EP | 0 171 017 A2 | 2/1986 |
| GB | 1086765 | 10/1967 |

* cited by examiner

Primary Examiner—Mark Eashoo
(74) Attorney, Agent, or Firm—Sughrue Mion, PLLC (57) ABSTRACT

A method for processing thermoplastics in a shaping device, whereby before and/or during its passage in the shaping device the thermoplastic is submitted to a static electrical field.

25 Claims, 6 Drawing Sheets

PET COMPARISON (80 X 88)

FIG 15

RECYCLED PEHD

FIG 16

POLYPROPYLENE (Tube 8 X 12)

METHOD AND DEVICE FOR TRANSFORMING CRYSTALLINE OR SEMICRYSTALLINE POLYMERS

The present application is a Continuation in part of co-pending International application No. PCT/BE01/00012, with an international filing date of Jan. 24, 2001, published in French under PCT Article 21(2) on Jul. 26, 2001 which claims the benefit of the priority of Belgian Patent Application BE2000/0052 filed on Jan. 24, 2000.

FIELD OF THE INVENTION

The object of the present invention is a method for processing thermoplastic materials, more particularly materials containing at least one crystalline or semi-crystalline polymer or copolymer having a melting point, a crystallization temperature and a glass transition temperature.

THE STATE OF THE ART

Polymer processing, in particular the extrusion of solid or hollow profiles, is well known in the state of the art. Conventional devices such as vacuum tanks, extrusion dies, etc., are suited to thermoplastics that do not undergo sudden variations in viscosity, such as polyethylene, polyvinyl chloride, etc.

The known devices cannot be used with crystalline or semi-crystalline polymers such as polyethylene terephthalate (PET), because the very low viscosity phase is very rapidly followed by a gel phase, in other words there is too rapid a transition from a material that is too liquid to be introduced into a shaping fixture to a material that is too rigid to be shaped. On the other hand, the withdrawal of the shaping mandrel rod, for example in the case of a tube extrusion, gives rise to great friction which cannot be compensated by the thrust of an extruder screw.

BRIEF DESCRIPTION OF THE INVENTION

The object of the present invention is a method that makes it possible, inter alia, to extrude crystalline or semi-crystalline polymer, more particularly polyethylene terephthalate, but equally a method that makes it possible to more readily extrude thermoplastic materials such as polyethylene, polypropylene, PVC, polycarbonate, etc.

The method according to the invention is especially applicable to the processing of crystalline or semi-crystalline polymer, preferably polymers or polymer mixes that present solid crystals below the crystallization temperature, advantageously presenting substantially only solid crystals below the crystallization temperature. In particular, the crystalline polymer or copolymer contains less than 40% by weight of non-crystalline or semi-crystalline polymer(s) or presenting liquid crystals below the crystallization temperature. More particularly, the crystalline or semi-crystalline polymer contains less than 20% by weight of liquid crystalline polymer and/or less than 20% by weight of polyolefin, in particular no or substantially no liquid crystalline polymers and polyolefins (for example less than 10% by weight of liquid crystalline polymer and less than 10% by weight of polyolefins). The liquid crystalline polymers are thermotropic polymers which present liquid crystals at a temperature lower than the crystallization temperature but higher than the hardening point.

The method according to the invention is a method for processing thermoplastic materials presenting a melting point and a solidification temperature, wherein the thermoplastic material is heated to a temperature higher than the melting point, and wherein said heated material is processed in a forming device by lowering therein the temperature of the thermoplastic material from a temperature at least close to the melting point, to a temperature below the solidification temperature, said method being characterised by subjecting the thermoplastic material, before its passage in the forming device and/or during its passage in or through at least a part of the forming device, to a static electric field between a positive electrode and a negative electrode or earth, said electrodes or said electrode and earth being in contact with the thermoplastic material.

It is an advantage if, before and/or during its passage in the forming device, the thermoplastic material is subjected to a static electric field of at least 800,000 V/m, preferably at least 1,000,000 V/m, more particularly from 5,000,000 V/m to 20,000,000 V/m, between a positive electrode and a negative electrode in contact with the thermoplastic material.

The application time of the electric field over a zone of thermoplastic material may vary, for example, from a fraction of a second to a some seconds, or even several minutes. This application time may for example be between 0.5 and 45 seconds.

It is an advantage if, before and/or during its passage in the forming device, the thermoplastic material moves between a positive electrode and a negative electrode or earth in contact with the thermoplastic material, said field being substantially perpendicular to the flow of the thermoplastic material between the positive electrode and the negative electrode or earth.

An electrostriction and/or inverse piezoelectric effect is preferably created in the thermoplastic material between the positive electrode and the negative electrode or earth.

It is an advantage if the thermoplastic material is subjected to a substantially radial electric field whilst it is being formed, from a temperature of the material above or close to melting point, down to a temperature that corresponds to a solid state of the material.

According to one preferred embodiment, the method according to the invention is a method involving processing a thermoplastic material that contains at least one crystalline or semi-crystalline polymer or copolymer having a melting point, a crystallization temperature lower than the melting point, and a glass transition temperature, said polymer or copolymer preferably presenting substantially only solid crystals below the crystallization temperature, in which the material is heated to a temperature higher than the melting point of the crystalline or semi-crystalline polymer or copolymer, and in which said heated material is processed in a forming device (such as shaping fixtures, moulds, dies and combinations thereof) by lowering therein the temperature of the material from a temperature higher than the crystallization temperature, to a temperature lower than the glass transition temperature of the crystalline or semi-crystalline polymer or copolymer.

The method presents the feature that the material is subjected to a static electric field, at least in respect of a temperature higher than the glass transition temperature, and preferably in respect of a temperature higher than the crystallization temperature (advantageously at least in respect of a temperature range higher than the glass transition temperature, and preferably in respect a temperature range higher than the crystallization temperature).

According to one practical embodiment of the method, the material is subjected to an electric field at least whilst the temperature is being lowered from a temperature higher than the crystallization temperature, to a temperature lying between the glass transition temperature and the crystallization temperature.

The electric field is in particular applied to create an electrostriction effect and/or inverse piezoelectric effect. The electrostriction effect is in particular produced at a temperature close to the crystallization temperature of the crystalline polymer or copolymer, whereas the inverse piezoelectric effect is produced at a temperature close to the glass transition temperature. These effects make it possible for the polymer to more easily flow and slide over the contact surface, notably over the surface of the electrodes in contact with the material.

Under one preferred form of embodiment, at least whilst the temperature is being lowered from a temperature higher than the crystallization temperature, to a temperature lying between the crystallization temperature and the glass transition temperature [in particular to a temperature close to the glass transition temperature (preferably lower than or roughly equal to the glass transition temperature), the material is subjected to a static electric field. It was observed that in addition to less resistance to friction, this improved the mechanical properties or characteristics of the product.

For example, the material is subjected to a static electric field over a temperature range that extends from a temperature higher than the crystallization temperature, down to a temperature at least 20° C. lower than the crystallization temperature, advantageously at least 50° C. lower than the crystallization temperature, and preferably at least 100° C. lower than the crystallization temperature.

According to one practical embodiment, at least in respect of a temperature close to melting point the material is subjected to a static electric field. This is an advantage because it was observed that at a constant throughput of material through a die, the pressure needed to force the material through the die was less in cases where an electric field was applied, for example at least halved with respect to the pressure needed when no electric field was applied.

According to one especially practical embodiment, the material is subjected to a static electric field at least in respect of a temperature close to melting point, as well as in respect of a temperature range extending between a first temperature higher than the crystallization temperature and a second temperature lying between the crystallization temperature and the glass transition temperature, preferably in respect of a range of temperatures extending from a temperature close to (in particular higher than) melting point, down to a temperature lower than the crystallization temperature, in particular close to the glass transition temperature.

According to a feature contained in one embodiment, the electric field has a strength of at least 800,000 volts/m, advantageously at least 1,000,000 volts/m, and preferably at least 2,000,000 volts/m, for example from 2,000,000 volts/m to 20,000,000 volts/m, more specifically from 5,000,000 V/m to 20,000,000 V/m, notably 5,000,000 V/m, 8,000,000 V/m and 10,000,000 V/m.

In the method according to the invention, the material is advantageously subjected to a radial and/or longitudinal and/or transverse electric field, but preferably at least radial or in a direction passing through the thickness of the material, more particularly in a direction substantially perpendicular to the direction in which the material flows in the die or the forming device.

According to one embodiment, the material is made to melt in an adiabatic or substantially adiabatic manner in the forming device.

According to one practical embodiment, a material containing at least one additive is processed so as to raise the dielectric characteristic, i.e. the dielectric constant or permittivity. This for example involves adding to the material a sufficient amount of additive to raise the dielectric constant or permittivity of the crystalline or semi-crystalline polymer or copolymer by at least 10%. Examples of suitable additives are titanium based compounds such as barium titanate, titanium dioxide ($TiO_2$), etc.

The method according to the invention is particularly well suited to processing PET, possibly contaminated or containing additives or fillers, for example PET derived from PET preform or bottle manufacturing waste.

According to one detail of a method according to the invention, the forming device is a shaping fixture on an extruder or mould. The electric field may also be applied on a die, more particularly an extrusion die. The die or forming device advantageously has a mandrel rod designed to form the internal shape of the extrudate or extruded article and a wall designed to form the external shape or contour of the extrudate or extruded article. This mandrel rod is advantageously fixed or substantially fixed with respect to the die or shaping fixture. A radial electric field is therefore advantageously created between the mandrel rod and the wall designed to form the external shape of the extrudate or extruded article, the mandrel rod advantageously constituting a negative electrode or earth, whereas the wall advantageously constitutes a positive electrode.

The forming device of the method according to the invention is advantageously a mould and/or a shaping fixture of an extruder, for example a shaping fixture operatively associated with a die for producing a profile, tube, etc. The forming device may also be a mould and/or die, or the injection runner or runners of a mould, so as for example to reduce the injection pressure and/or increase the number of cavities in the mould.

Another object of the invention is a product made from a crystalline or semi-crystalline polymer or copolymer (contaminated or otherwise) obtained by the method according to the invention. It is an advantage if the product is made from PET, possibly contaminated or containing additives or fillers. It was observed that by inducing an axial static electric field, especially one that is radial with respect to a wall of the product, it was possible to enhance the mechanical characteristics of said wall.

Under one particular embodiment of the article according to the invention, the product is a bottle preform.

Yet another object of the present invention is a device for imparting a shape to a thermoplastic material under a method according to the invention. This device comprises:

- a die and/or shaping chamber which has a passage for introducing the material (for example at a temperature close to melting point, preferably higher than melting point, or at a temperature higher than the crystallization temperature or at a temperature lower than the crystallization temperature), said chamber or die having one or more walls in contact with the thermoplastic material (in order to shape it);
- a cooling means so as to cool one or more walls at least partially; and
- a means for connecting at least one wall or part-wall (part or portion of wall) of the chamber or die in contact with the thermoplastic wall to an electrical source in order to create a static electric field between at least said wall or part-wall (part of wall or portion of wall) and another wall or part-wall (part or portion of wall) of the chamber or die (walls or part-walls which are in contact with the thermoplastic material).

It is an advantage if the device includes a first means for connecting a first wall or part of wall (part-wall) to a pole (for example the positive pole) of an electrical source, and a second means for connecting another wall or part-wall to another pole (for example the negative pole) of the electrical source or to earth, such that the first wall or part of wall (part-wall) forms a positive electrode.

According to one possible embodiment, the device includes or is operatively associated with a means for creating a static electric field and a means having a positive electrode and a negative electrode or earth, said electrodes or earth being in contact with the thermoplastic material, said means creating between said electrodes or between the positive electrode(s) and earth a static electric field of at least 800,000 V/m, preferably at least 1,000,000 V/m (more particularly higher than 2,000,000 V/m, for instance from 5,000,000 V/m to 20,000,000 V/m).

The positive electrode and the negative electrode or earth preferably constitute walls of a channel in which the thermoplastic material moves in one direction, said electrodes or earth being arranged so as to create a static electric field substantially perpendicular to the direction in which the material flows in the channel.

According to a detail of one embodiment, the device has a die which is operatively associated with a shaping chamber, and means for connecting one or more walls of the die and of the shaping chamber to at least one electrical source, so as to create a static electric field in the die and a static electric field in the shaping chamber.

According to one practical embodiment, the forming device, advantageous operatively associated with a die, presents a defined channel between one wall of a positive electrode and one wall of a negative electrode or earth, said channel presenting a passage for introducing thermoplastic material that is molten (or close to melting point) into the channel. Substantially the entire surface of the wall(s) of the channel of the forming device (plus, if appropriate, that/those of the die) in contact with the thermoplastic material is constituted by electrode walls or by electrode walls and the earth. It is an advantage if the electrodes and/or earth are positioned or disposed so that an electric field is applied substantially radially throughout the forming device, as well as in the die if appropriate. Where the forming device presents a passage for the shaped material to exit (for instance at a temperature lower than the crystallization temperature, for example a temperature lying between the glass transition temperature and the crystallization temperature), the electrodes (or the electrode(s) and earth) are advantageously disposed or arranged so as to create a radial electric field in the material, substantially extending from the passage for introducing the material into the forming device, as far as the passage for the material to leave the forming device.

According to one practical embodiment, the wall or walls of the forming device or of the shaping fixture or of the mould and/or of the die in contact with the material are provided with aluminium oxide, notably being covered with a layer containing aluminium oxide.

According to one embodiment, the device has a mandrel rod designed to form the internal shape of the article formed in the shaping chamber, the latter presenting a wall designed to form the external shape of the article. The mandrel rod and the wall designed to form the external shape of the article constitute electrodes or an electrode and an earth for creating a radial electric field, the mandrel rod advantageously constituting a negative electrode or earth, whilst the wall advantageously constitutes a positive electrode.

It is an advantage if the device has a positive electrode and a negative electrode that are arranged so as to form between them an electric field and constituting walls of the shaping chamber in contact with the thermoplastic material, the positive electrode advantageously being made from an aluminium alloy, the contact face of the electrode with the thermoplastic material preferably being provided with a layer of aluminium oxide at least 25 $\mu$m thick.

According to one noteworthy feature, the walls of the forming device or of the shaping fixture and/or of the die in contact with the thermoplastic material are provided with aluminium oxide, more particularly being covered with a layer containing aluminium oxide.

According to one embodiment the shaping chamber is a mould.

It is an advantage if one or more insulating means extend between the positive electrode or the electrode connected to the positive pole of a current source, and the earth or negative electrode or the electrode connected to negative pole of a current source, an insulating means advantageously being formed by a layer of an insulating or dielectric fluid or liquid.

The device advantageously presents a chamber in contact with the positive electrode, containing the insulating fluid or liquid, and passages that communicate with said chamber, said passages being provided with a means of connecting the chamber to an insulating liquid or fluid circulating system, said system advantageously incorporating a cooling system.

According to a detail of one embodiment, the length of the positive electrode or positive electrodes in contact with the material—said length being calculated in the direction in which the material advances in the shaping chamber or die—is more than 5 cm, advantageously more than 10 cm, and preferably more than 20 cm. This length is for example somewhere between 20 cm and 2 m, or even more. The length of the positive electrode or positive electrodes will be determined in response to the zones in which an electric field is to be applied, in response to the throughput rate of the material, in response to the grade of articles being produced, to the size and thickness of the articles, etc.

The device according to the invention is more particularly a device for shaping a material made of crystalline or semi-crystalline polymer or copolymer using a method according to the invention. The device comprises:

a shaping chamber presenting a port for introducing the material at a temperature higher than the crystallization temperature, said chamber extending at least between a first wall or first part of wall and a second wall or second part of wall;

a cooling means in order to cool at least one wall or part of wall of the chamber;

if appropriate a die, the outlet of which communicates with the port for introducing material into the shaping chamber; and a means for creating a static electric field between at least one portion of the first wall or first part-wall and at least one portion of the second wall or second part of wall and/or in the die.

The device preferably has a die and means for creating an electric field in the die and in the shaping chamber.

It is an advantage if the device according to the invention has a means for feeding the material into the shaping chamber adiabatically or substantially adiabatically (i.e.

without heat exchange or transfer), at a temperature higher than the crystallization temperature.

The shaping chamber preferably presents an exit port through which the shaped material leaves at a temperature lower than the glass transition temperature. For example, the shaping chamber is an extrusion die, more particularly one for extruding a hollow profile, tube, conduit, sheath, etc.

According to possible forms of embodiment, the means for creating an electric field incorporates at least two electrodes disposed so as to create a radial and/or transverse and/or longitudinal electric field.

The means for creating an electric field preferably incorporates at least two electrodes disposed so as to create a radial electric field in the shaping chamber. According to one especially practical variant, the device furthermore incorporates at least two electrodes disposed so as to create a radial electric field in the die.

According to one preferred form of embodiment, the means for creating an electric field is arranged relative to the cooling means so as to create an electric field at least in one zone of the shaping chamber in which the material passes from a temperature higher than the crystallization temperature to a temperature substantially the same as the glass transition temperature.

According to another possible form of embodiment, the device incorporates one or more means for creating an electric field at least in one zone of the die and at least in one zone of the shaping chamber, so as to apply an electric field to the material from a temperature higher than the melting point down to a temperature lower than the crystallization temperature, for example down to a temperature close to the glass temperature, or even lower than the glass temperature.

According to a detail of one embodiment, the device has a mandrel rod designed to form the internal shape of the article formed in the shaping chamber, said chamber having one wall designed to form the external shape of the article. The mandrel rod and the wall designed to form the external shape of the article constitute electrodes for creating a radial electric field, the mandrel rod advantageously constituting a negative electrode or earth, whilst the wall advantageously constitutes a positive electrode.

According to another detail of one embodiment, the device has a positive electrode and a negative electrode which are arranged so as to form an electric field between them and constituting walls of the shaping chamber in contact with the crystalline or semi-crystalline polymer or copolymer, the positive electrode advantageously being made from aluminum alloy, with the face that is in contact with the crystalline or semi-crystalline polymer or copolymer preferably being treated to receive a layer of aluminum oxide at least 25 µm thick.

Further noteworthy features and details of the invention will be apparent from the description of some exemplary embodiments. This description makes reference to the accompanying drawings.

DESCRIPTION OF PREFERRED EMBODIMENTS

Figure 1:
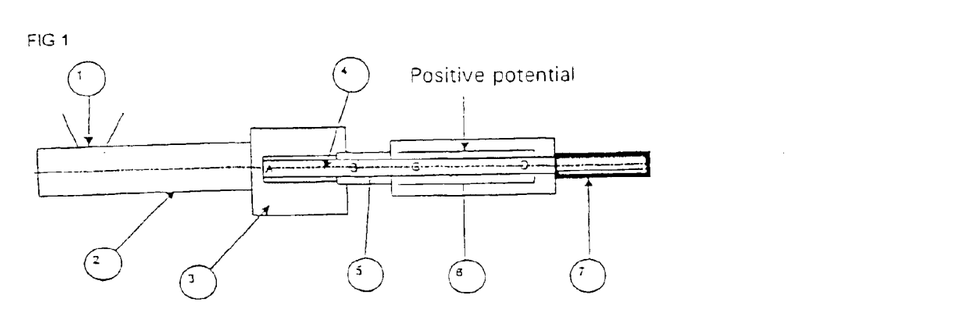
FIG. 1 is a schematic view of an extruder equipped with a device according to the invention.

FIG. 1 shows an extruder 2 receiving crystalline or semi-crystalline polymer (for example PET in the form of granules or slivers) through the feed hopper 1. The polymer is melted in the extruder 2 and is forced into the head 3, which in zone A thereof is equipped with a mandrel rod 4 designed to produce the internal shape of the extrudate. The extrudate then passes into an adiabatic zone B (zone 5 where there is no, or substantially no, heat exchange). It is an advantage if this zone is convergent, i.e. if the throughput section of said zone decreases in the direction in which the material advances. The temperature of the polymer in this zone 5 is slightly higher than the crystallization peak, for example a temperature 1° to 20° C. higher than the crystallization peak. Next the melted polymer passes into zone C, which is subjected to strong cooling and to a strong electric field. Zone C thus constitutes a condenser 6. This electric field is maintained until the temperature of the polymer is the same or less than the glass transition temperature of the polymer (zone D). The stabilized product 7 accordingly exits from the extrusion die.

Figure 2:
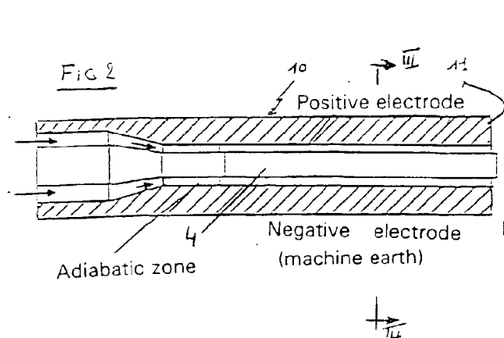
FIG. 2 is a sectional view of a detail of the extrusion die from FIG. 1.

FIG. 2 is a sectional view of the extrusion die, extended by a forming device. The unit comprising the die/forming device 10 has an envelope 11 incorporating a passage along which extends the mandrel rod 4. The mandrel rod 4 forms a negative electrode or the machine's earth, whereas the envelope 11 forms the positive electrode. The electric field thereby created is a radial field directed towards the mandrel rod 4. This radial electric field (see FIG. 3) induces an electrostriction phenomenon in the crystallites, which manifests itself in a slight detachment of the polymer relative to the positive electrode (the temperature of the polymer being lower than the crystallization temperature or peak). The inside face of the envelope 11 is for example made from aluminum alloy, advantageously treated and coated with a layer of aluminum oxide $Al_2O_3$. This slight detachment makes it possible for the product to move in the extrusion die by the force of the extruder screw and enables the product to exit from the extrusion die. In the present case the electric field between the electrodes was a field of 5,000,000 V/m. The material for instance enters the unit 10 at a temperature higher than the melting point and exits at a temperature lower than the crystallization temperature.

The positive electrode 11 is insulated from the earth (for example by electric insulation pads) and is operatively associated with one or more cooling ducts.

During its passage or flow in the unit 10 (from its entry up to its outlet in the case of FIG. 2, i.e. its complete passage or flow in the unit 10), the thermoplastic material is submitted to a static radial electrical field.

The cooling of the unit 10 (extrusion die and/or forming device) is for example realized by means of an electrical insulating fluid with a high calorific value, more particularly by means of a dielectric oil.

One possibility would have been to use low-temperature gas circulation, for example employing nitrogen, to carry out said cooling.

This insulating fluid therefore also serves as an electrical insulator for the positive electrode. This insulation is for example useful if the channels in which the fluid is flowing are formed between the positive electrode and an earth, but is likewise useful for insulating the positive electrode from the insulating fluid circulation system or cooling system.

In the case of FIG. 1, the product leaving the extrusion die is a tube with an external diameter of 9 cm and a wall 0.5 cm thick.

Figure 3:
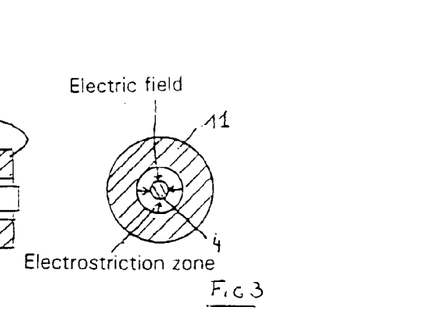
FIG. 3 is a transverse sectional view through the extrusion die.
Figure 4:
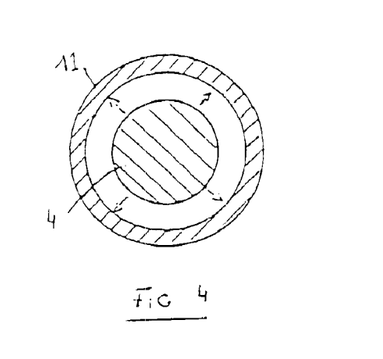
FIGS. 4 to 7 are views showing the positioning of the electrodes so as to obtain a particular field.

FIG. 4 represents a cross-section taken through an extrusion die similar to the one in FIG. 3, except for the fact that the mandrel rod constitutes the positive electrode and the envelope 11 constitutes the negative electrode.

Figure 5:
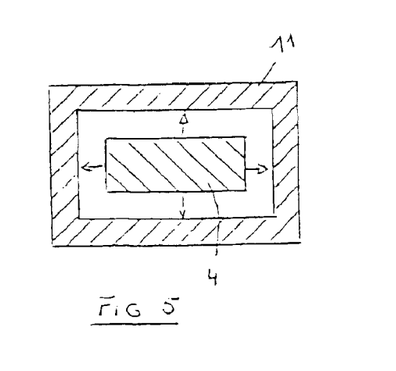

FIG. 5 represents a cross-section taken through a die for extruding a hollow profile of rectangular cross-section. In this embodiment the mandrel rod of rectangular cross-section constitutes the positive electrode, while the envelope 11 constitutes the negative electrode.

Figure 6:
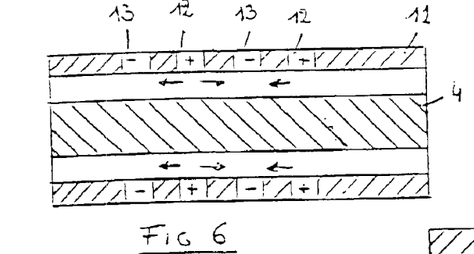

FIG. 6 schematically represents a longitudinal section taken through an extrusion die, the envelope 11 of which has a series of distinct elements 12; 13 which form positive electrodes and negative electrodes, a positive electrode 12 being separated from a negative electrode 13 by an insulating element. The electrodes are disposed perpendicularly to the extrudate's axis of displacement, thereby subjecting the polymer to a longitudinal electric field, a field whose direction is parallel to the direction in which the extrudate is displaced.

Figure 7:
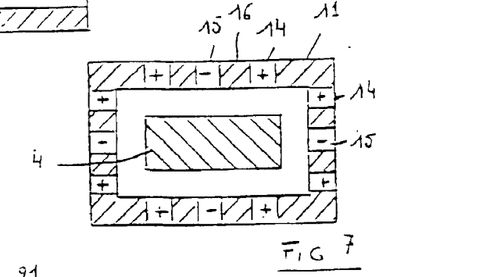

FIG. 7 is a partly sectional view showing a die whose envelope 11 has a series of distinct elements 14, 15 forming positive electrodes and negative electrodes, one positive electrode 14 being separated from a negative electrode 15 by an insulating element 16. The electrodes are positioned relative to one another so as to define transverse electric fields, the direction of which is perpendicular to the direction in which the extrudate is displaced.

It goes without saying that it is possible to create electric fields that are constituted by operatively associating a radial electric field, a longitudinal electric field and/or a transverse electric field, by positioning the electrodes in an appropriate manner. If, for example, the mandrel rod is a negative electrode, radial and oblique electric fields will be created in the devices shown in FIGS. 6 and 7, in addition to the longitudinal or transverse fields.

Figure 8:
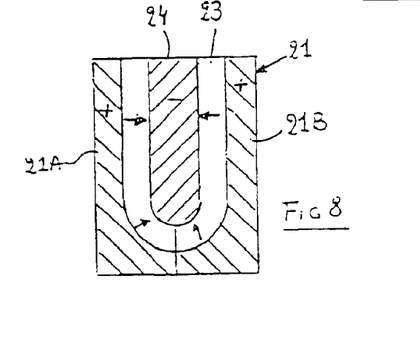
FIG. 8 is a schematic view of a mould according to the invention.

FIG. 8 represents a mould 20 constituted by an outer envelope 21 comprising two parts 21A, 21B which may be separated from one another so as to enable the moulded part to be withdrawn. A cavity 23 is defined within said envelope 21. Into this cavity 23 extends a core, for example a cylindrical core 24, said core being fixed on the injection machine. The mould is advantageously equipped with cooling means. The envelope 21 for example constitutes a positive electrode, while the core 24 constitutes a negative electrode, or vice versa.

Figure 9:
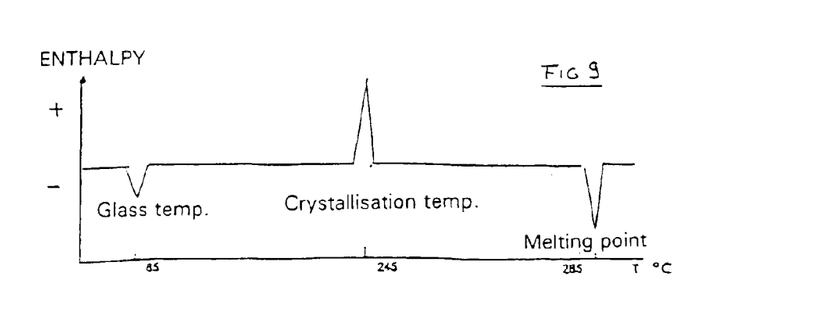
FIG. 9 represents the enthalpic curve of the PET obtained by the DSC (differential scanning calorimetry) method.

FIG. 9 represents a PET enthalpy curve, said curve depicting a (hollow) glass transition peak corresponding to the PET glass transition temperature, a crystallization peak corresponding to the PET crystallization temperature, and a (hollow) melting peak corresponding to the PET melting point.

In order to raise the dielectric constant of the PET it may be useful to add additives that possess dielectric properties to the crystalline or semi-crystalline polymer. Such additives will be familiar to anyone skilled in the art. In particular, barium titanate and/or $TiO_2$ will be used, in the form of powder or fine flakes. For example, the quantity of additive (s) possessing dielectric properties will be between 0.01 and 25%, advantageously between 0.1 and 10% by weight of the crystalline or semi-crystalline polymer, and in particular with respect to the weight of PET polymer.

Figure 10:
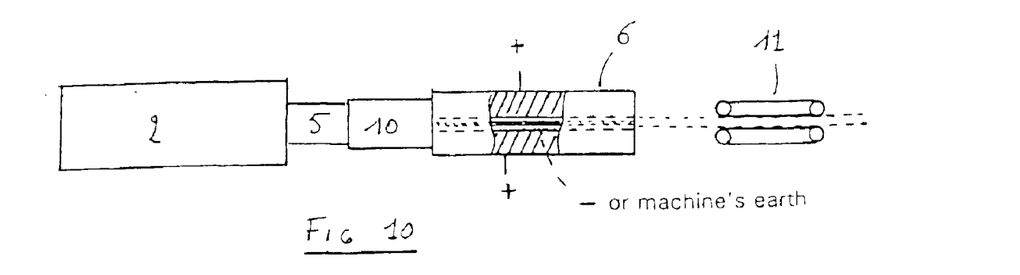
FIGS. 10 to 12 are schematic views of specific embodiments of the device according to the invention.

FIG. 10 is a view showing a device according to the invention that is similar to the one in FIG. 1. This device features:
  an extruder 2;
  an adiabatic zone 5;
  a die 10;
  a shaping fixture 6; and
  a traction system 11 which draws the product 7 outside of the shaping fixture.

In the embodiment seen in FIG. 10, the shaping fixture 6 is equipped with means for applying a radial static electric field. The product obtained exhibited mechanical characteristics improved by 30% compared to the product obtained when no electric field was applied.

Figure 11:
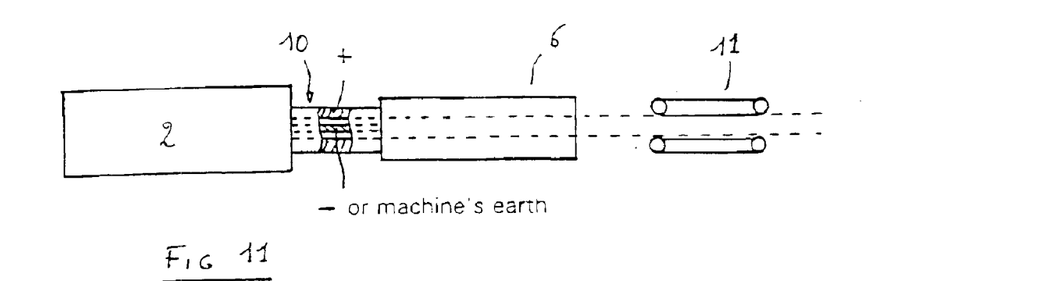

In the embodiment seen in FIG. 11, the device is similar to that in FIG. 10, except for the fact that there is no adiabatic zone 5 (the product exiting from the extruder passes straight into the die 10) and that a static electric field is applied to the material passing into the die 10 instead of into the shaping fixture 6. The electric field is advantageously radial. It was observed that by applying a radial electric field in the die, a lesser extruder pressure was sufficient to ensure the same throughput of extruded product as when no electric field was applied. In the case of crystalline polymer, it was observed that the extruder pressure could be reduced by a factor of 5 to 10 when a radial electric field of at least 5,000,000 volts/m was applied, while maintaining the same throughput as an extruder operatively associated with a die in respect of which no electric field is applied.

By applying such an electric field in the die it is therefore possible to raise the throughput of extruded material by utilizing the extrusion pressure employed in the case where no electric field is applied to the die. By controlling the force of the radial electric field and/or by controlling the pressure of the extruder it is therefore possible to control the throughput of extruded material.

Figure 12:
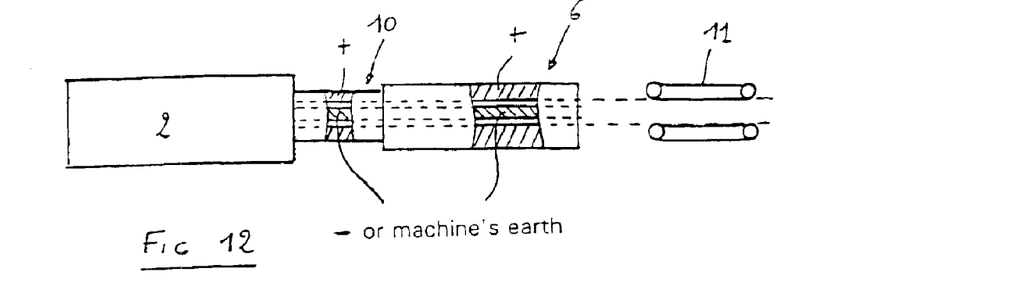

Finally, the device seen in FIG. 12 is similar to the one in FIG. 11, except for the fact that a radial electrical field is applied to the shaping fixture 6. This device makes it possible on the one hand to increase the production of an existing extruder and on the other hand to improve the mechanical characteristics of the extruded product.

Figure 13:
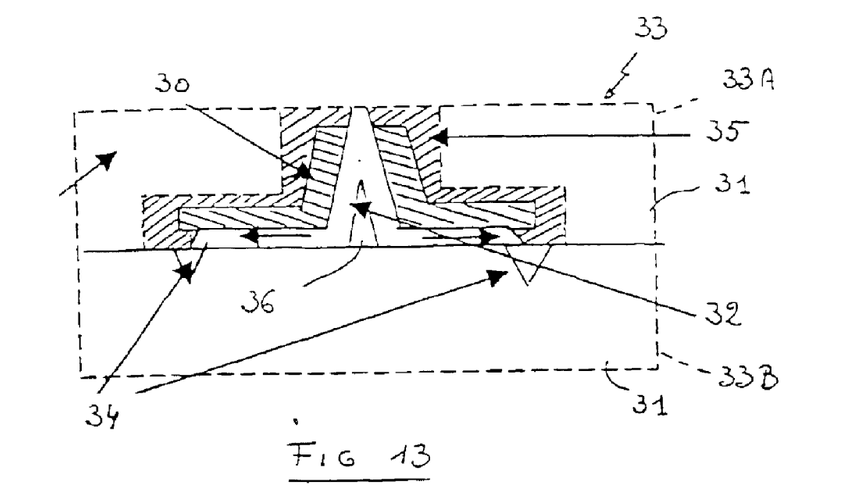
FIG. 13 represents an arrangement of electrodes in an injection runner of a mould.

FIG. 13 schematically shows one possible arrangement of electrodes (positive electrode 30, negative electrode or earth 31) in an injection runner 32 of a mould 33, having for example a fixed part 33A with respect to the head of an injector and a moving part 33B adapted to execute a relative motion with respect to part 33A, in order to enable the moulded article to be removed from the cavity or cavities 34. The injection runner 32 has a finger or means 36 for distributing the polymer flow to the various cavities 34 of the mould or to a plurality of locations in the mould cavity or cavities. The fixed part of the mould presents a positive electrode 30 which is insulated by an insulating layer 35 from the frame 33A1 of part 33A. The frame 33A1 is joined to the injector's earth. The moving part 33B is arranged so as to be connected to the injector's earth, at least when part 33B is resting against part 33A (with the mould in the closed position). The moving part 33B therefore also forms an earth at least when the mould 33 is in the closed position. In the embodiment shown, the finger or means 36 is carried by part 33B. The insulating layer 35 also provides insulation between the positive electrode and the injector head. If the injector head is provided with a positive electrode, the positive electrode of the mould is advantageously connected to the positive electrode of the injector, the positive electrode of the injector then being insulated from the frame 33A1.

During injection, the melted material flows into the injection runners 32, and notably between the positive electrode and the means 36 and one face of part 33B. The material is accordingly subjected to a field perpendicular to the direction in which the material flows in part 33A.

In the case where part 33A is provided with cooling ducts, these ducts will be arranged along the face of the positive electrode that is not in contact with the material being injected, the cooling fluid then being an electrical insulating fluid, more particularly an electrical insulating cooling oil, or a dielectric oil.

Figure 14:
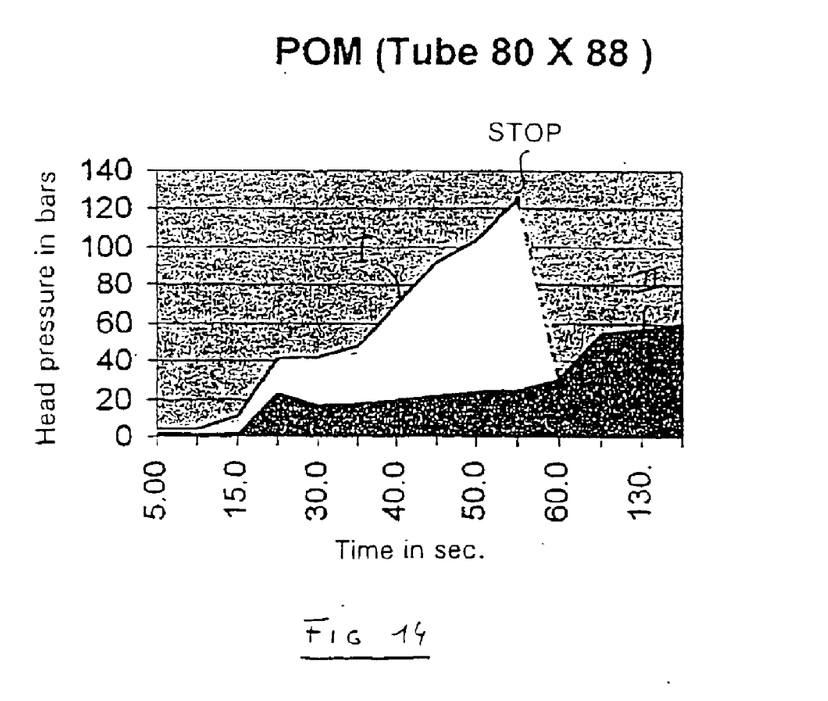
FIG. 14 shows how the pressure required for POM to pass through a forming device evolves over time (where time 0 corresponds to the start time of introducing polymer into the device), with and without applying a radial electric field.

FIG. 14 shows the pressures exerted by the screw of an extruder which is advancing polyoxymethylene (crystalline polymer) into a polarized forming device [radial field applied to the material from the time that the material is introduced into the device (temperature close to melting point) until it leaves the device at a temperature close to the glass transition temperature] and into the unpolarized forming device from the time that the material is introduced at a temperature close to melting point.

It can be seen from this Figure that where the forming device is not polarized (curve I), the flow is in a first adiabatic period (±15 seconds), after which a front or abrupt increase in the pressure is observed (due to the polymer's crystallization peak). Thereafter a pressure increment is observed up to a time of 30 seconds after the introduction of the material. The pressure then continues to rise until the maximum permissible pressure of the forming device and of the extruder is reached (120 bars). Due to the material having cooled, a plug of material has formed in the forming device and a pressure of 120 bars was not enough to force the material out of the forming device.

When it comes to polarizing the forming device (radial electric field of 5,000,000 volts/m applied to the material), just after material enters the forming device a pressure lower than that prevailing when no electric field is applied is observed (curve II), followed by a 20 bar increment up to 60 seconds (time measured from when the material is introduced). Next an abrupt increase in pressure is observed due to the fall in temperature of the material in the forming device, followed by a pressure increment of approx. 60 bars. The shaped material exits from the device at a pressure of around 60 bars.

This Figure therefore shows that by applying an electric field in the forming device it is possible to greatly reduce the maximum pressure that it is necessary to apply in order to force the material to pass through the forming device.

Figure 15:
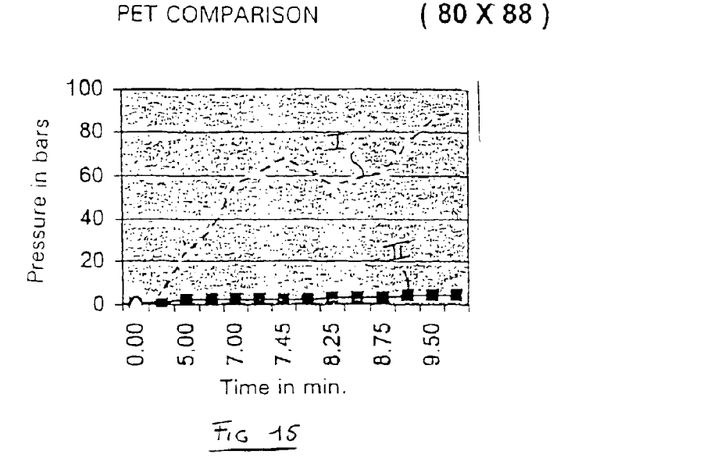
FIGS. 15 to 17 are graphs similar to the one in FIG. 14, except for the fact that the extruded material is respectively PET, high-density PE, and polypropylene.

FIG. 15 is a figure similar to FIG. 14, but showing the effect of an electric field in the forming device for PET. It can be seen from this Figure that by applying an electric field (curve II), the maximum pressure required to pass the material through the device is reduced. Curve I shows the pressure needed when no electric field is applied.

Figure 16:
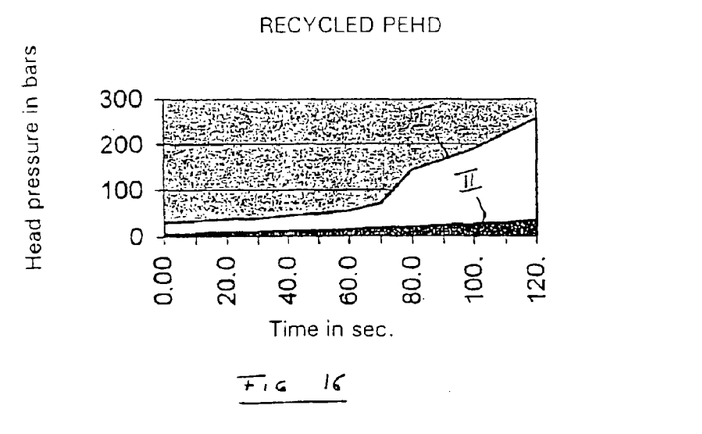
Figure 17:
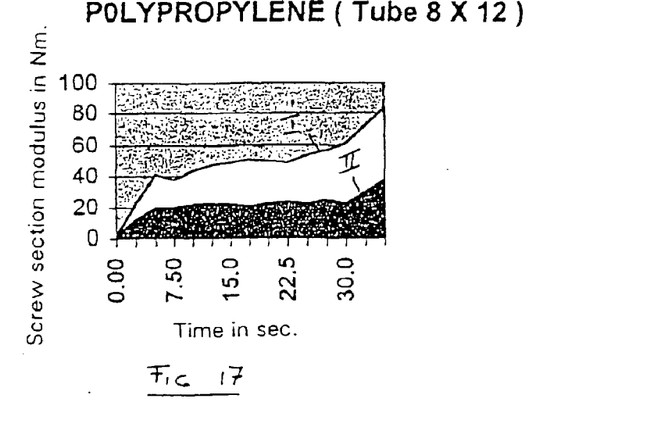

Lastly, FIGS. 16 and 17 are figures similar to FIG. 14, but applied respectively to recycled high-density polyethylene and to polypropylene. This figure also shows that by applying an electric field (in this example radial: curve II) it is possible to reduce the maximum pressure needed to pass material through the forming device. Curve I shows the pressure necessary when no electric field is applied.

Such a reduction in pressure shows that by applying an electric field the friction of the material on one or more walls of the forming device is substantially reduced. This lesser friction makes it possible to either increase production or reduce the wear on the extruder and/or on the forming device, to reduce accidents due to accidental blockages of material in the forming device, etc.

PET, POM and high-density PE test pieces were also prepared by applying a radial electric field of 5,000,000 volts/m in the forming device, together with other test pieces in the forming device without applying an electric field. Accordingly a resistance to traction was observed that was substantially the same for the test pieces with the electric field as for the test pieces without the electric field. However, as far as the modulus of elasticity is concerned, it was observed that the POM and PET test pieces had a modulus of elasticity approximately 60% higher when an electric field was applied than was the case with the modulus of the specimen prepared in the absence of an electric field. In the case where the test pieces prepared with an electric field were post-cured (post-curing carried out for 48 hours at a temperature 20° C. higher than the glass transition temperature), the test pieces prepared using the electric field and post-cured still had a modulus of elasticity approximately 20 to 30% higher than the modulus of elasticity of the test pieces that were not prepared using an electric field and post-cured.

The following Table gives Young's modulus of elasticity (expressed in MPa) for a test piece moulded without an electric field (A), a test piece moulded without an electric field but with post-curing (B), and a test piece prepared with an electric field.

| Test piece | Modulus MPa | Ratio of modulus test piece X/test piece C |
|---|---|---|
| A | 1297 | 1.61 |
| B | 1725 | 1.33 |
| C | 2088 | 1 |

The method according to the invention may be used to manufacture many different parts, such as moulded parts, extruded parts, panels, rails, profiles, sheets, troughs (e.g. cable troughs), profiles with T-sections, profiles with U-sections, profiles with I-sections, profiles with L-sections, profiles with X-sections, etc.

Figure 18:
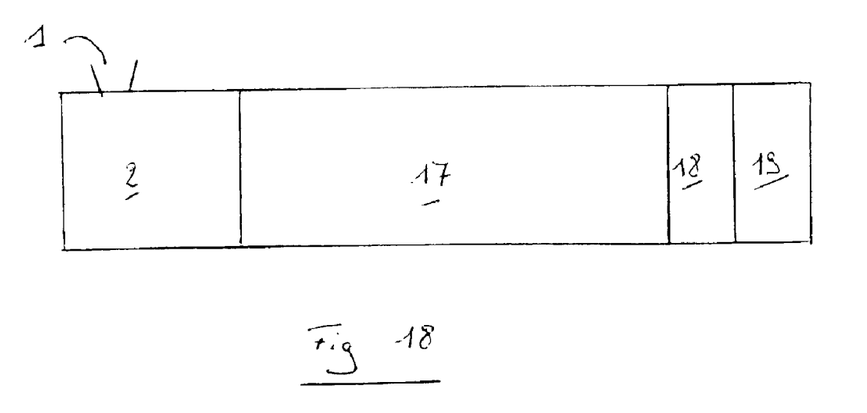
FIG. 18 is a schematic view of a further embodiment of a device of the invention.

FIG. 18 is a schematic view of an embodiment of a device of the invention. In said device, an extruder 2 receives crystalline or semi-crystalline polymer or copolymer with a low crystallization rate (such as a PET with a low crystallization rate) trough the feed hopper 1. The polymer or copolymer is melted in the extruder and is forced into a electrostriction converter 17 in which the temperature of the polymer or copolymer is rapidly reduced below the crystallization temperature. For example, the reduction of the temperature below the crystallization temperature is made in less than 60 seconds, advantageously in less than 30 seconds, preferably in less than 15 seconds, such as in less than 10 seconds, for example in about 8 seconds, 5 seconds, etc.

Due to the rapid cooling of the polymer or copolymer, the polymer or copolymer has no or substantially no crystallites, and can be easily transformed.

The polymer or copolymer escaping the electrostriction converter enters then a mechanical device 18, such as a gear pump or a screw pushing device, for pushing the polymer or copolymer in a die or a shaping device 19. The die or shaping device is advantageously a cold die or cold shaping device, said die or shaping device having a limited length. The gear pump or screwing device is also adapted for limiting the temperature reduction of the polymer or copolymer, whereby the polymer or copolymer enters the die or shaping device 19 at a temperature greater than the glass transition temperature. The polymer or copolymer after its passage in the cold die or shaping device has advantageously a temperature below the glass transition temperature.

For ensuring the rapid cooling of the polymer or copolymer below the crystallization temperature, the converter 17 is shaped so as to ensure a quick cooling, for example a temperature reduction from about 270–290° C. up to 150° C.–170° C. in about 8 seconds for a PET polymer. The electrostriction effect is obtained by submitting the polymer or copolymer to a static electrical field of more than 1,000,000 volt/m, such as a static electric field of 5,000,000 Volt/m. For example, the converter is shaped so that the thickness of the polymer or copolymer (such as a PET polymer) between the positive electrode and the negative electrode or earth is less than 10 mm, advantageously less than 5 mm, preferably equal to about 2.5 mm, or even most preferably lower than 2.5 mm.

For example, when the device of FIG. 18 is used for shaping product with PET, the temperature of the PET at the entry of the converter is about equal to the melting point of the PET or is lower than said melting point, while at the outlet of the converter, the temperature of the PET is within the range of 150–170° C. The PET is then pushed in the cold die or shaping device 19 at a temperature of about 150° C.

I claim:

1. A method for processing thermoplastic materials presenting a melting point and a solidification temperature,
   wherein the thermoplastic material is heated to a temperature higher than the melting point, and
   wherein said heated material is processed in a forming device by lowering therein the temperature of the thermoplastic material from a temperature at least close to the melting point, to a temperature below the solidification temperature,
   said method comprising a treatment step selected from the group consisting of:
   step of subjecting the thermoplastic material, before its passage in the forming device, to a static electric field between a positive electrode in contact with the thermoplastic material and a reference electrode selected from the group consisting of negative electrode and earth, said reference electrode being in contact with the thermoplastic material;
   step of subjecting the thermoplastic material, during its passage through at least a part of the forming device, to a static electric field between a positive electrode in contact with the thermoplastic material and a reference electrode selected from the group consisting of negative electrode and earth, said reference electrode being in contact with the thermoplastic material; and
   step of subjecting the thermoplastic material, before and during its passage in the forming device, to a static electric field between a positive electrode in contact with the thermoplastic material and a reference electrode selected from the group consisting of negative electrode and earth, said reference electrode being in contact with the thermoplastic material.

2. The method of claim 1, in which the treatment step is carried out by subjecting the thermoplastic material to a static electric field of at least 800,000 V/m, between a positive electrode in contact with the thermoplastic material and a reference electrode selected from the group consisting of negative electrode and earth, said reference electrode being in contact with the thermoplastic material.

3. The method of claim 1, in which the treatment step is carried out by subjecting the thermoplastic material to a static electric field of at least 1,000,000 V/m, between a positive electrode in contact with the thermoplastic material and a reference electrode selected from the group consisting of negative electrode and earth, said reference electrode being in contact with the thermoplastic material.

4. The method of claim 1, in which the treatment step of subjecting the thermoplastic material to a static field is carried while the thermoplastic material moves between a positive electrode and a reference electrode selected from the group consisting of negative electrode and earth, said reference electrode being in contact with the thermoplastic material, whereby said field is substantially perpendicular to the flow of the material between the positive electrode in contact with the thermoplastic material and the reference electrode in contact with the thermoplastic material.

5. The method of claim 1, in which an electrostriction effect is created in the thermoplastic material between the positive electrode and the reference electrode.

6. The method of claim 1, in which the material is subjected to a static electric field at least in respect of a temperature range higher than the crystallization temperature.

7. A method for processing a thermoplastic material containing at least one compound selected among the group consisting of crystalline polymers, crystalline copolymers, semi-crystalline polymers and semi-crystalline copolymer, said compound presenting a melting point, a crystallization temperature lower than the melting point, and a glass transition temperature,
   in which the material is heated to a temperature higher than the melting point of the compound, and
   in which said heated material is processed in a forming device by lowering therein the temperature of the material from a temperature higher than the crystallization temperature to a temperature lower than the glass transition temperature of the compound,
   said method comprising a treatment step selected from the group consisting of:
   step of subjecting the thermoplastic material, before its passage in the forming device, to a static electric field between a positive electrode in contact with the thermoplastic material and a reference electrode selected from the group consisting of negative electrode and earth, said reference electrode being in contact with the thermoplastic material;
   step of subjecting the thermoplastic material, during its passage in the forming device, to a static electric field between a positive electrode in contact with the thermoplastic material and a reference electrode selected from the group consisting of negative electrode and earth, said reference electrode being in contact with the thermoplastic material; and step of subjecting the thermoplastic material, before and during its passage in the forming device, to a static electric field between a positive electrode in contact with the thermoplastic material and a reference electrode selected from the group consisting of negative electrode and earth, said reference electrode being in contact with the thermoplastic material whereby the material is subjected to a static electric field at least in respect of a temperature higher than the glass transition temperature.

8. The method of claim 7, in which the material is subjected to a static electric field at least in respect of a temperature range higher than the crystallization temperature.

9. The method of claim 7, in which the material is subjected to an electric field at least whilst the temperature is being lowered from a temperature higher than the crystallization temperature, to a temperature lying between the glass transition temperature and the crystallization temperature.

10. The method of claim 7, in which the material is subjected to a static electric field at least whilst the temperature is being lowered from a temperature at least substantially equal to the crystallization temperature, to a temperature close to the glass transition temperature.

11. The method of claim 7, in which the material is subjected to a static electric field at least whilst the temperature is being lowered from a temperature higher than the crystallization temperature, to a temperature close to the glass transition temperature.

12. The method of claim 7, in which the material is subjected to a static electric field at least in respect of a temperature close to melting point.

13. The method of claim 12, in which the material is subjected to a static electric field at least in respect of a temperature close to melting point, as well as in respect of a temperature range extending between a temperature higher than the crystallization and a temperature lying between the crystallization temperature and the glass transition temperature.

14. The method of claim 7, in which the electric field has a strength of at least 1,000,000 volts/m.

15. The method of claim 7, in which the electric field has a strength of at least 2,000,000 volts/m.

16. The method of claim 7, in which the material is subjected to an electric field selected from the group consisting of at least radial electric fields and electrical fields at least substantially perpendicular to the direction in which the material flows.

17. The method of claim 7, in which that the material contains at least one additive to raise the dielectric characteristic.

18. The method of claim 7, in which the material is a PET, possibly contaminated or containing additives or fillers.

19. The method of claim 7, in which the forming device is selected from the group consisting of shaping fixtures of extruders, moulds and extruder dies.

20. The method of claim 7, for extruding an extruded product with an internal shape and an external shape, in which the forming device incorporates a mandrel rod designed to form the internal shape of the extruded product and a wall designed to form the external shape of the extruded product, whereby a radial electric field is created between the mandrel rod and the wall designed to form the external shape of the extruded product.

21. The method of claim 7, for extruding an extruded product with an internal shape and an external shape, in which the forming device incorporates a mandrel rod designed to form the internal shape of the extruded product and a wall designed to form the external shape of the extruded product, whereby a radial electric field is created between the mandrel rod and the wall designed to form the external shape of the extruded product, the mandrel rod constituting the reference electrode, whereas the wall constitutes the positive electrode.

22. The method of claim 7, in which an electrical insulating fluid is used to cool the positive electrode.

23. The method of claim 7, in which the thermoplastic material is subjected to a static electrical field while being submitted to a cooling such that the temperature of the thermoplastic is lower than the crystallization temperature in less than 60 seconds.

24. The method of claim 7, in which the thermoplastic material is subjected to a static electrical field while being submitted to a cooling such that the temperature of the thermoplastic is lower than the crystallization temperature in less than 15 seconds.

25. The method of claim 23, in which the thermoplastic material subjected to a static electrical field while being submitted to a cooling such that the temperature of the thermoplastic is lower than the crystallization temperature in less than 60 seconds is then pushed in a shaping device.

* * * * *